United States Patent
Brink, Jr. et al.

(10) Patent No.: US 8,301,113 B2
(45) Date of Patent: Oct. 30, 2012

(54) METHOD FOR MANAGING WIRELESS DEVICES USING EXCEPTION MONITORING

(75) Inventors: Kenneth A. Brink, Jr., Highlands Ranch, CO (US); Randy S. Johnson, Ofallon, MO (US); Raymond T. Malkowski, Round Rock, TX (US); Jeffrey H. Martin, Canton, GA (US); Tedrick N. Northway, Wood River, IL (US); Patrick J. Richards, Jr., Marietta, GA (US); Duane L. Winkler, Shawnee, KS (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 11/734,001

(22) Filed: Apr. 11, 2007

(65) Prior Publication Data

US 2008/0254763 A1  Oct. 16, 2008

(51) Int. Cl.
*H04M 11/00* (2006.01)
(52) U.S. Cl. ...... 455/405; 455/406; 455/408; 455/414.1
(58) Field of Classification Search .................. 455/405, 455/406, 408, 414.1
See application file for complete search history.

(56) References Cited

U.S. PATENT DOCUMENTS

| | | |
|---|---|---|
| 6,256,515 B1 | 7/2001 | Cox et al. |
| 6,308,053 B1 | 10/2001 | Nilsson |
| 6,308,067 B1 | 10/2001 | Morgan |
| 6,687,496 B1 | 2/2004 | Nangle |
| 6,847,970 B2 | 1/2005 | Keller et al. |
| 6,920,319 B2 | 7/2005 | Knutsson et al. |
| 7,010,002 B2 | 3/2006 | Chow et al. |
| 2001/0044325 A1* | 11/2001 | Cox et al. ........................ 455/565 |
| 2002/0081995 A1 | 6/2002 | Leppinen et al. |
| 2002/0154751 A1* | 10/2002 | Thompson et al. ...... 379/114.01 |
| 2004/0063463 A1 | 4/2004 | Boivin |
| 2004/0067747 A1* | 4/2004 | Carpenter et al. ............ 455/405 |
| 2005/0041648 A1 | 2/2005 | Bharatia et al. |
| 2005/0054324 A1 | 3/2005 | Chmaytelli et al. |
| 2006/0031399 A1 | 2/2006 | Sherman et al. |
| 2006/0223495 A1* | 10/2006 | Cassett et al. ................. 455/405 |
| 2008/0319808 A1* | 12/2008 | Wofford et al. ................... 705/6 |

OTHER PUBLICATIONS

"Asset Tracking System for Networked or Networkable Assets". IBM Research Disclosure Article #456171, Apr. 2002, p. 692.

* cited by examiner

*Primary Examiner* — Jinsong Hu
*Assistant Examiner* — Michael Nguyen
(74) *Attorney, Agent, or Firm* — Anna L. Linne; Hoffman Warnick LLC

(57) ABSTRACT

An improved solution for managing use of a plurality of wireless devices is provided. In an embodiment of the invention, a usage policy is obtained for the plurality of wireless devices. Usage data for one or more of the plurality of wireless devices is compared against the usage policy, wherefrom an exception report is derived and created. In another embodiment, the exception report is analyzed for non-compliance and a customer is notified.

22 Claims, 2 Drawing Sheets

METHOD FOR MANAGING WIRELESS DEVICES USING EXCEPTION MONITORING

FIELD OF THE INVENTION

Aspects of the invention relate generally to a method for managing wireless devices, and more particularly, to a solution for using exception monitoring in the management of wireless devices.

BACKGROUND OF THE INVENTION

Usage of wireless devices such as a mobile phone, a smartphone, a personal digital assistant (PDA), etc. has exploded in recent time. Although this tremendous increase in use has effected the individual owner, there are additional complications created for a group, organization, and/or company that are using wireless devices. As the types, number, and usage of wireless devices continues to increase, it becomes critical for a company to better manage aspects of the wireless devices, such as the number and/or types of wireless devices, as well as to accurately track charges, such as monthly utilization, to actual cost. Companies also find a requirement to help ensure that costs/billing be applied to a particular division, department, and/or individual level. Other important issues include keeping and tracking available information on the asset(s), such as what manufacturer, model, and/or software is installed, and how the wireless device is configured. Wireless device users also require wireless device support, either live or self-help, for problem resolution. Software updates are another requirement, keeping the wireless device up-to-date with the latest fixes and/or enhancements.

An illustrative scenario is a corporation, XYZ Corp. (XYZ), which requires mobile phones and PDA devices for employees. As such, XYZ contracts both with a cellular service provider, CP1, and with CP2, a mobile phone and PDA device provider. Both CP1 and CP2 are to each provide services for corporate and personal employee usage of their respective wireless devices. This requires XYZ and/or the employees to contact each provider (i.e., CP1, CP2) for monthly usage, billing, support, etc. Certainly with any size company, but in particular with large companies, because of the vast quantities of wireless devices and the use thereof, and/or the globalization of a company, suitable and efficient management of the wireless devices has quickly become less attainable.

A consideration in managing wireless devices is unacceptable use of the wireless devices. Unacceptable uses may include, for example, fraud, misuse, overrun in cost usage, unauthorized calls, unauthorized use of Internet, and/or the like. Efficiently managing, monitoring, and/or controlling unacceptable use in wireless devices is compounded by multiple wireless devices, multiple wireless device providers, multiple third party wireless carrier providers and/or the complexity and structure of the company itself.

In view of the foregoing, a need exists to overcome one or more of the deficiencies in the related art.

SUMMARY OF THE INVENTION

Aspects of the invention provide an improved solution for managing use of a plurality of wireless devices. In an embodiment of the invention, a usage policy is obtained for the plurality of wireless devices. Usage data for one or more of the plurality of wireless devices is compared against the usage policy, wherefrom an exception report is derived and created.

In another embodiment, the exception report is analyzed for non-compliance and a customer is notified.

A first aspect of the invention provides a method of managing use of a plurality of wireless devices, the method comprising: obtaining at least one usage policy for the plurality of wireless devices; comparing usage data for at least one of the plurality of wireless devices against the at least one usage policy; and creating an exception report, derived from the comparing.

A second aspect of the invention provides a system for managing use of a plurality of wireless devices, the system comprising: a system for obtaining at least one usage policy for the plurality of wireless devices; a system for comparing usage data for at least one of the plurality of wireless devices against the at least one usage policy; and a system for creating an exception report, derived from the comparing.

A third aspect of the invention provides a computer program comprising program code stored on a computer-readable medium, which when executed, enables a computer system to implement a method of managing use of a plurality of wireless devices, the method comprising: obtaining at least one usage policy for the plurality of wireless devices; comparing usage data for at least one of the plurality of wireless devices against the at least one usage policy; and creating an exception report, derived from the comparing.

A fourth aspect of the invention provides a method of generating a system for managing use of a plurality of wireless devices, the method comprising: providing a computer system operable to: obtain at least one usage policy for the plurality of wireless devices; compare usage data for at least one of the plurality of wireless devices against the at least one usage policy; and create an exception report, derived from the comparing.

A fifth aspect of the invention provides a data processing system for managing use of a plurality of wireless devices, comprising: a processing unit; a bus coupled to the processing unit; and a memory medium coupled to the bus comprising program code, which when executed by the processing unit causes the data processing system to: obtain at least one usage policy for the plurality of wireless devices; compare usage data for at least one of the plurality of wireless devices against the at least one usage policy; and create an exception report, derived from the comparing.

A sixth aspect of the invention provides computer software embodied in at least one propagated signal for managing use of a plurality of wireless devices, the at least one propagated signal comprising instructions for causing at least computer system to: obtain at least one usage policy for the plurality of wireless devices; compare usage data for at least one of the plurality of wireless devices against the at least one usage policy; and create an exception report, derived from the comparing.

A seventh aspect of the invention provides a business method for managing use of a plurality of wireless devices, the business method comprising managing a network that includes at least one computer system that performs the process described herein; and receiving payment based on the managing.

The illustrative aspects of the invention are designed to solve one or more of the problems herein described and/or one or more other problems not discussed.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an improved solution for managing wireless devices including the use of exception monitoring. In an embodiment of the invention, usage policies are obtained from, for example, the customer. These usage policies are then compared to a wireless device usage data, whereby an exception report is derived. In another embodiment, the exception report is analyzed for non-compliance and the customer is notified. As used herein, unless otherwise noted, the term "set" means one or more (i.e., at least one) and the phrase "any solution" means any now known or later developed solution.

Figure 1:
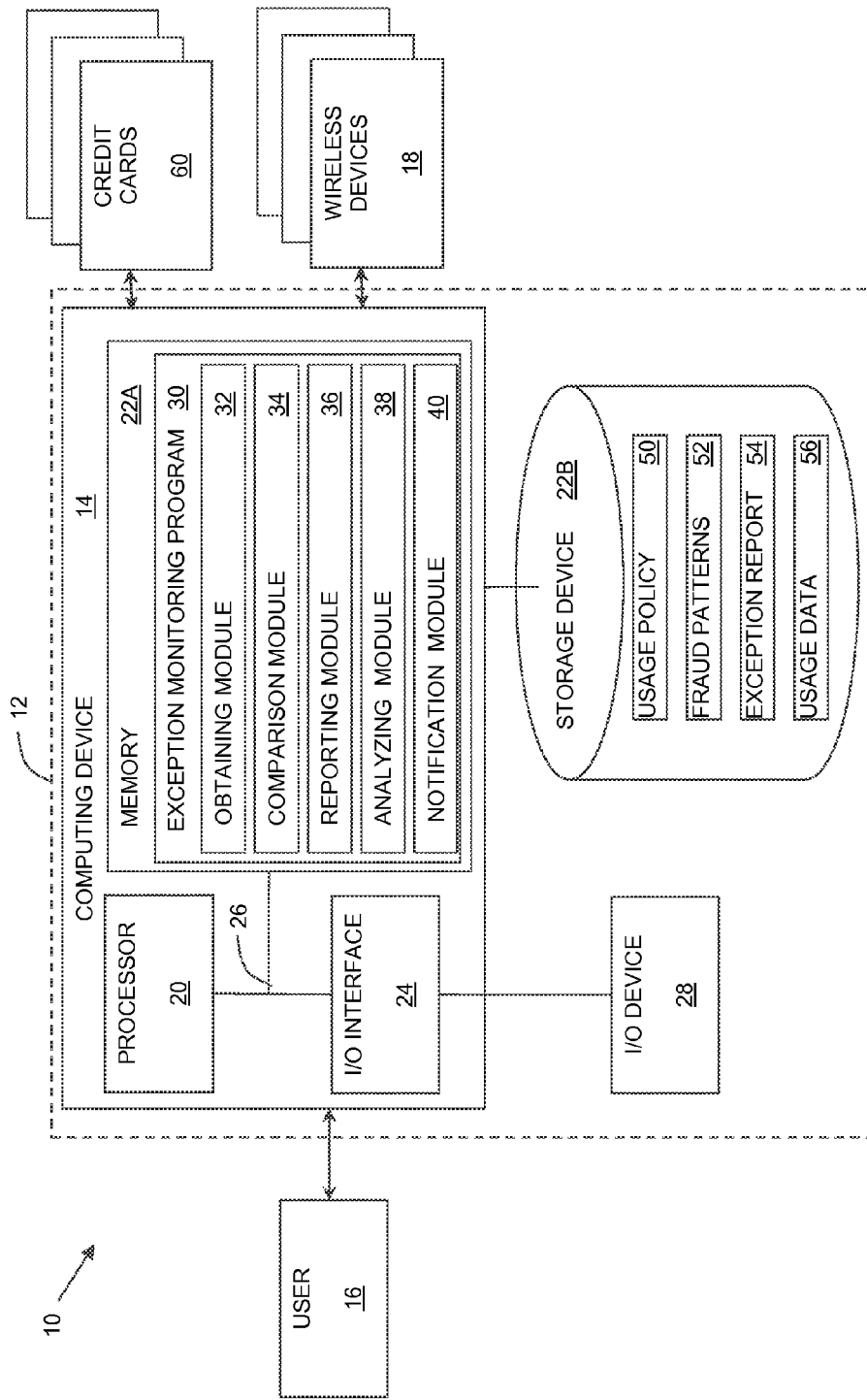
FIG. 1 shows an illustrative environment for managing wireless devices using exception monitoring according to an embodiment of the invention.

Turning to the drawings, FIG. 1 shows an illustrative environment 10 for managing wireless devices 18 over a network according to an embodiment of the invention. To this extent, environment 10 includes a computer system 12 that can perform the process described herein in order to manage wireless devices 18. In particular, computer system 12 is shown including a computing device 14 that comprises an exception monitoring program 30, which makes computing device 14 operable to manage wireless devices 18 by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as exception monitoring program 30, which is stored in a storage system, such as memory 22A and/or storage device 22B. While executing program code, processor 20 can read and/or write data, such as usage policy 50, fraud patterns 52, exception report 54, and/or the like to/from memory 22A, storage device 22B, and/or I/O interface 24. Bus 26 provides a communications link between each of the components in computing device 14. I/O device 28 can comprise any device that transfers information between a user 16 and computing device 14. To this extent, I/O device 28 can comprise a user I/O device to enable an individual user 16 to interact with computing device 14 and/or a communications device to enable a system user, such as a wireless device 18, to communicate with computing device 14 using any type of communications link.

In any event, computing device 14 can comprise any general purpose computing article of manufacture capable of executing program code installed thereon. However, it is understood that computing device 14 and exception monitoring program 30 are only representative of various possible equivalent computing devices that may perform the process described herein. To this extent, in other embodiments, the functionality provided by computing device 14 and exception monitoring program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, exception monitoring program 30 enables computer system 12 to manage a plurality of wireless devices 18 over a network. To this extent, exception monitoring program 30 is shown including an obtaining module 32, a comparison module 34, a reporting module 36, an analyzing module 38, and a notification module 40. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Regardless, aspects of the invention provide a solution for managing wireless devices 18 over a network. The network can comprise any combination of public and/or private networks. In an embodiment of the invention, the network comprises a peer-to-peer (P2P) network. The P2P network can comprise a private network and/or can comprise a public network, such as the Internet. In any event, computer system 12 can comprise a peer in the P2P network and can share with other peers (not shown) on the P2P network. Additionally, computer system 12 can obtain shared content from one or more of the peers. It is understood that each peer can be configured similar to computer system 12. The configuration of peers has not been shown for clarity.

Usage policy 50, fraud patterns 52, exception report 54, and/or usage data 56 (e.g., content) can comprise any type of electronic data. For example, usage policy 50 can comprise a single data file that includes electronic data stored in any compressed or uncompressed format. However, it is understood that usage policy 50 can be embodied in any number of data files and/or other storage solutions. Fraud patterns 52, exception reports 54, and usage data 56 have similar possible compositions and configurations. Usage policy 50, fraud patterns 52, exception reports 54 and/or usage data 56 can be shared between peers and/or user 16 using any solution. For example, in a P2P network, computer system 12 can communicate/receive all of content 50, 52, 54, 56 to/from a single peer or user 16 or can communicate/receive only a portion of content 50, 52, 54, 56 to/from peer or user 16 while one or more other peers and/or user 16 provide other portion(s) of content 50, 52, 54, 56. Further, usage policy 50, fraud patterns 52, exception reports 54, and/or usage data 56 may be provided by a customer and/or a third party.

Figure 2:
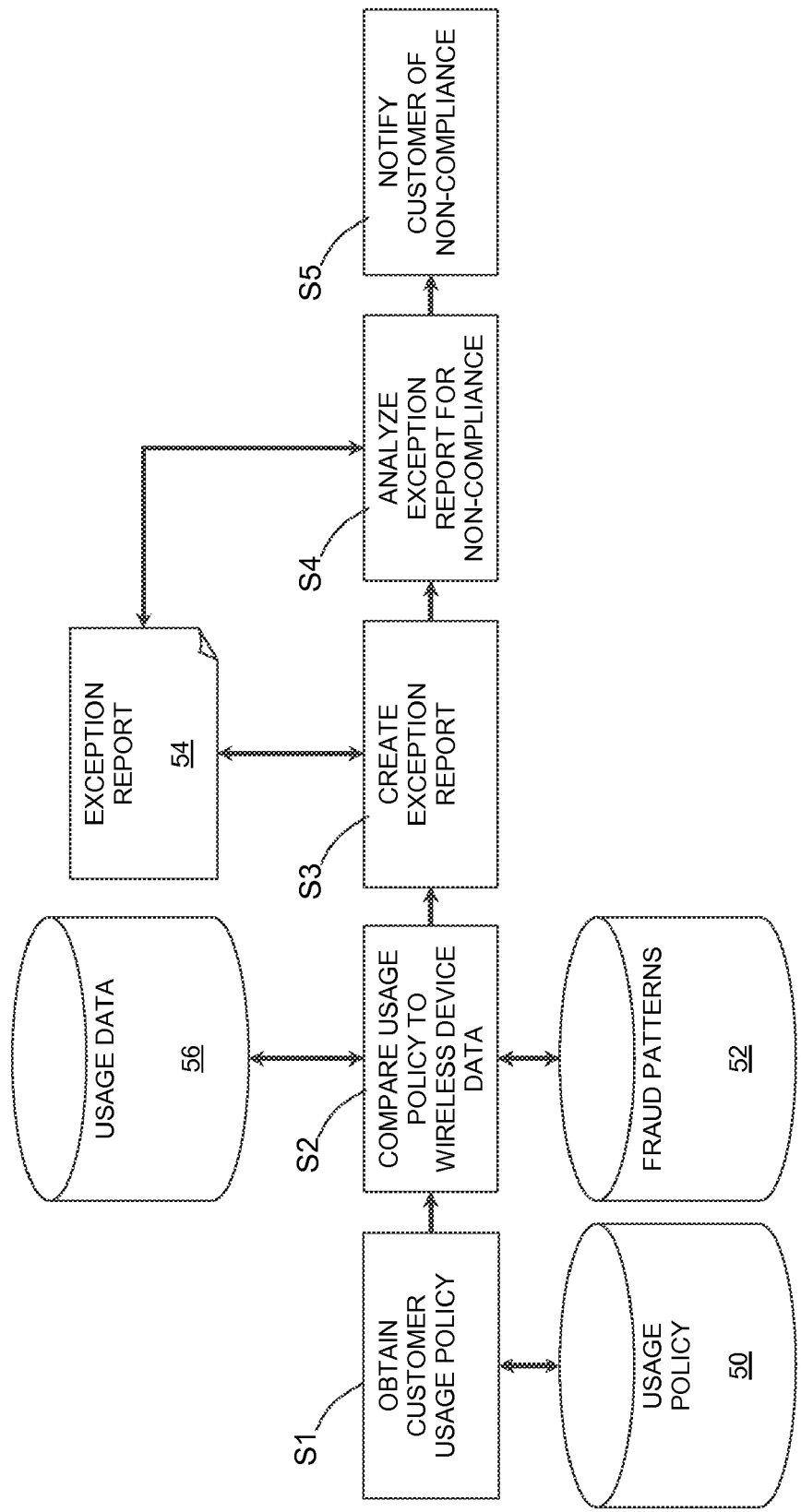
FIG. 2 shows an illustrative data flow for managing wireless devices using the modules of the exception monitoring program shown in FIG. 1 according to an embodiment of the invention.

Aspects of the invention provide an improved solution for managing wireless devices 18 for a customer. To this extent, FIG. 2 shows an illustrative data flow or method for using the modules of exception monitoring program 30 (FIG. 1) according to an embodiment of the invention. For example, a customer (e.g., corporation, company, partnership, group, organization, family, etc.) may desire to improve an overall management (e.g., control and monitoring) of a plurality of wireless devices 18 (FIG. 1) under its auspices. As such, under an embodiment of the invention, a method may be employed wherein S1 includes obtaining a usage policy 50 (e.g., customer's usage policy) regarding usage of wireless devices 18 using obtaining module 32 (FIG. 1). The usage policy 50 may be fixed or changed over time. It may include policies on what and/or who a wireless device 18 user (e.g., employee, consultant, temporary hire, etc.) is/is not allowed to contact (e.g., call, transmit to, etc.). For example, the wireless device 18 user, under the usage policy 50, may not be allowed to contact certain recipients based on certain phone numbers, email addresses, and/or websites. These recipients may be undesirable based on that they are, for example, commercial competitors, non-work related contacts, ex-employees, fraudulent activities (e.g., gambling), criminals, and/or the like. Similarly, the usage policy 50 may include not allowing a user to receive communication from certain senders based on certain phone numbers, email addresses, and/or websites. Similarly, the usage policy 50 may include restrictions on using the wireless device 18 based on date, time, and/or location of wireless device 18 during attempted use. For example, the usage policy 50 may include that wireless device 18 may only be used during work days, work hours, and/or to/from work locations. This type of restriction could, for example, prevent an employee from using the wireless device 18 during vacation, on Sundays, on sick days, and/or during non-work hours (e.g., at night, during lunch, etc.). Similarly, the usage policy 50 may include general usage restrictions on using the wireless device 18 based on, for example, total time usage (e.g., 2,000 minutes maximum) in a particular period of time (e.g., month, day, sales period, year, etc.).

The usage policy 50 is virtually limitless in its scope and scale. For example, perhaps a certain commercial competitor, Acme Inc., is an unacceptable communicant with the customer's wireless device 18 users. Acme may, for example, be purchased by the instant company that is employing methods herein. In such a case, the policy 50 may change so that future wireless device 18 communications to and/or from an Acme employee are allowable.

In any event, in S2, at least one aspect of the usage policy 50 is compared with wireless device 18 usage data 56 using comparison module 34 (FIG. 1). The usage data 56 may be provided by the customer and/or one or more service providers. Usage data 56 may include elements such as quantity of communications, type and/or content of communications, minutes of communications, costs of communications, and/or the like. In an alternative embodiment, comparison module 34 obtains the usage data 56 directly by monitoring wireless device 18 usage suing any solution.

In S3, an exception report 54 is created by reporting module 36 (FIG. 1). The exception report 54 may be presented using any tangible medium of expression now known or later developed. For example, the exception report 54 may be presented on a graphical user interface (GUI) and/or in a printed, hard-copy format. The exception report 54 may include information such as user identification information (e.g., name, position, address, etc.); wireless device 18 information (e.g., serial number, wireless device 18 type, service provider, wireless device 18 provider, etc); usage data 56 (e.g., minutes per call, time of call, number called, website contacted, etc.); usage policy 50 information; and/or the like. In this manner, a user 16 employing the method herein is able to more readily manage the use of wireless devices 18. The method and/or portions thereof may be employed in real-time, on a scheduled pattern (e.g., weekly, monthly, etc.), based on a "tripping" mechanism (e.g., budget value is exceeded), and/or on demand.

In an embodiment, the method additionally comprises S4, wherein analyzing module 38 (FIG. 1) analyzes exception report 54 for any non-compliance with usage policy 50. Analyzing module 37 can identify any type of non-compliance. For example, illustrative non-compliance such as excessive call minutes during non-work times; calling a competitor's phone number; the call(s) exceeded a time amount; calling a restricted phone number; accessing a restricted website; and/or the like. Further specific examples may be a first example: User 2383, in January, 2006, had 44 minutes of calls on a Saturday. A second example: User 9234, in January, 2006, called competitor's human resource phone and placed a 25 minute call. A third example: User 3495, in February 2006, accessed a 900 number call for 33 minutes. A fourth example: User 3872, in February 2006, accessed restricted website: www.competitor.com.

Additionally, the method may comprise S5, wherein the customer is notified, via notification module 40 (FIG. 1) of any non-compliance realized by analyzing module 38 (FIG. 1). Notification may be presented on a graphical user interface (GUI), in a printed, hard-copy format, and/or the like. In this manner, the customer may take appropriate action if deemed warranted.

In another embodiment, additional use of captured fraud patterns 52 may be employed. Each fraud pattern 52 can define an exception (e.g., non-compliance with usage policy 50). Fraud patterns 52 may include data on various past activity either derived "in-house" (e.g., from past exception reports 54) and/or obtained from outside, third parties and/or from a customer. For example, service provider(s), wireless device providers, law enforcement entities, and/or the like may provide data suitable for more readily ascertaining unacceptable wireless device 18 use. Fraud patterns 52 need not necessarily be legally fraudulent activity and therefore the use of the term "fraud" is not meant to be limiting.

In any event, if a fraud pattern 52 is employed, the method may further comprise the comparison module 34 further comparing fraud patterns 52 to the wireless device 18 usage data 56 discussed herein. In this manner, the comparison of fraud patterns 52 and/or usage policy 50 against wireless device 18 usage data 56 produces a robust exception report 54.

In still another embodiment of the invention, the additional monitoring of a set of credit cards 60 (FIG. 1) may be utilized. In this manner, usage policy 50 can further include usage policy(ies) for credit card(s) 60. At least one usage policy for a credit card 60 may be obtained. Credit card 60 usage data for the credit card 60 is also obtained. The usage policy for the credit card 60 is compared to the credit card 60 usage data by comparison module 34 (FIG. 1). Comparison module 34 may further compare the usage policy 50 with credit card 60 usage. Resultant exception report 54 derived by reporting module 36 (FIG. 1) includes various comparison data. Credit card 60 usage may, for example, provide dollar amount, vendor use, dates, times, and/or the like.

While shown and described herein as a method and system for managing wireless devices 18 for a customer, it is understood that the invention further provides various alternative embodiments. For example, in one embodiment, the invention provides a computer program stored on a computer-readable medium, which when executed, enables a computer system to manage wireless devices 18 for a customer. To this extent, the computer-readable medium includes program code, such as exception monitoring program 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of generating a system for managing wireless devices 18 for a customer. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that manages wireless devices 18 for a customer, which enables users to perform the process described herein on a subscription, advertising, and/or fee basis. That is, a service provider could offer to manage a network and/or a computer system 12 (FIG. 1) that manages wireless devices 18 for a customer as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computerized method of managing use of a plurality of wireless devices owned by a customer, the method comprising:

using a computer system including at least one computer device to obtain at least one usage policy for the plurality of wireless devices, wherein the at least one usage policy is set by the customer and includes rules for voice and data use of the plurality of wireless devices, wherein the rules include at least one of the following: restrictions as to third parties a user of a wireless device can contact, restrictions as to third parties a user of a wireless device can receive a communication from, and restrictions on use of a wireless device based on date, time or location of the wireless device during attempted use;

using the computer system to compare usage data for at least one of the plurality of wireless devices against the at least one usage policy to determine at least one violation of the usage policy by the usage data for at least one of the plurality of wireless devices;

using the computer system to create an exception report, derived from the comparing, wherein the exception report includes user identification information for the at least one of the plurality of wireless devices, wireless device and wireless device provider information for the at least one of the plurality of wireless devices, the usage data, the at least one usage policy and the at least one violation of the usage policy by the usage data; and using the computer system to present the exception report to a user.

2. The method of claim 1, further comprising using the computer system to notify the customer of the non-compliance.

3. The method of claim 1, further comprising using the computer system to obtain at least one fraud pattern defining an exception and using the computer system to compare the at least one fraud pattern to the usage data.

4. The method of claim 1, further comprising using the computer system to present the exception report in one of a graphical user interface (GUI) and a printed report.

5. The method of claim 1, further comprising using the computer system to monitor wireless device usage to obtain the usage data.

6. The method of claim 1, the method further comprising:

using the computer system to obtain at least one usage policy for a credit card owned by the customer;

using the computer system to obtain credit card usage data for the credit card; and using the computer system to compare the at least one usage policy for the credit card to the credit card usage data.

7. The method of claim 1, wherein the at least one usage policy includes dissemination of data to an unauthorized recipient of data.

8. The method of claim 1, wherein the at least one usage policy includes receipt of data from an unauthorized sender of data.

9. The method of claim 1, wherein at least one of:

the plurality of wireless devices are supplied by a plurality of providers; or the usage data is obtained from a plurality of providers.

10. A system for managing use of a plurality of wireless devices owned by a customer, the system for managing comprising:

a system for obtaining at least one usage policy for the plurality of wireless devices, wherein the at least one usage policy is set by the customer and includes rules for voice and data use of the plurality of wireless devices, wherein the rules include at least one of the following: restrictions as to third parties a user of a wireless device can contact, restrictions as to third parties a user of a wireless device can receive a communication from, and restrictions on use of a wireless device based on date, time or location of the wireless device during attempted use;

a system for comparing usage data for at least one of the plurality of wireless devices against the at least one usage policy to determine at least one violation of the usage policy by the usage data for at least one of the plurality of wireless devices a system for creating an exception report, derived from the comparing, wherein the exception report includes user identification information for the at least one of the plurality of wireless devices, wireless device and wireless device provider information for the at least one of the plurality of wireless devices, the usage data, the at least one usage policy and the at least one violation of the usage policy by the usage data; and a system for presenting the exception report to a user.

11. The system for managing of claim 10, further comprising a system for notifying the customer of the non-compliance.

12. The system for managing of claim 10, further comprising a system for obtaining at least one fraud pattern defining an exception and a system for comparing the at least one fraud pattern to the usage data.

13. The system for managing of claim 10, further comprising a system for monitoring wireless device usage, thereby obtaining the usage data.

14. The system for managing of claim 10, the system for managing further comprising:
   a system for obtaining at least one usage policy for a credit card owned by the customer;
   a system for obtaining credit card usage data for the credit card; and
   a system for comparing the at least one usage policy for the credit card to the credit card usage data.

15. The system for managing of claim 10, wherein the at least one usage policy includes using the computer system to disseminate data to an unauthorized recipient of data.

16. The system for managing of claim 10, wherein the at least one usage policy includes receipt of data on the computer system from an unauthorized sender of data.

17. The system for managing of claim 10, wherein at least one of:
   the plurality of wireless devices are supplied by a plurality of providers; or
   the usage data is obtained from a plurality of providers.

18. A computer program comprising program code stored on a non-transitory computer-readable storage medium, which when executed, enables a computer system to implement a method of managing use of a plurality of wireless devices owned by a customer, the method comprising:
   obtaining at least one usage policy for the plurality of wireless devices, wherein the at least one usage policy is set by the customer and includes rules for voice and data use of the plurality of wireless devices, wherein the rules include at least one of the following: restrictions as to third parties a user of a wireless device can contact, restrictions as to third parties a user of a wireless device can receive a communication from, and restrictions on use of a wireless device based on date, time or location of the wireless device during attempted use;
   comparing usage data for at least one of the plurality of wireless devices against the at least one usage policy to determine at least one violation of the usage policy by the usage data for at least one of the plurality of wireless devices;
   creating an exception report, derived from the comparing, wherein the exception report includes user identification information for the at least one of the plurality of wireless devices, wireless device and wireless device provider information for the at least one of the plurality of wireless devices, the usage data, the at least one usage policy and the at least one violation of the usage policy by the usage data; and
   presenting the exception report to a user.

19. A method of generating a system for managing use of a plurality of wireless devices owned by a customer, the method comprising:
   providing a computer system operable to:
      obtain at least one usage policy for the plurality of wireless devices, wherein the at least one usage policy is set by the customer and includes rules for voice and data use of the plurality of wireless devices, wherein the rules include at least one of the following: restrictions as to third parties a user of a wireless device can contact, restrictions as to third parties a user of a wireless device can receive a communication from, and restrictions on use of a wireless device based on date, time or location of the wireless device during attempted use;
      compare usage data for at least one of the plurality of wireless devices against the at least one usage policy to determine at least one violation of the usage policy by the usage data for at least one of the plurality of wireless devices;
      create an exception report, derived from the comparing, wherein the exception report includes user identification information for the at least one of the plurality of wireless devices, wireless device and wireless device provider information for the at least one of the plurality of wireless devices, the usage data, the at least one usage policy and the at least one violation of the usage policy by the usage data; and
      present the exception report to a user.

20. The method of claim 19, wherein the computer system is further operable to:
   obtain at least one fraud pattern defining an exception, and
   compare the at least one fraud pattern to the usage data.

21. The method of claim 19, wherein the computer system is further operable to:
   obtain at least one usage policy for a credit card owned by the customer;
   obtain credit card usage data for the credit card; and
   compare the at least one usage policy for the credit card to the credit card usage data.

22. The method of claim 19, wherein at least one of:
   the plurality of wireless devices are supplied by a plurality of providers; or the
   usage data is obtained from a plurality of providers.

* * * * *